United States Patent
Akiyama et al.

(10) Patent No.: US 9,736,327 B2
(45) Date of Patent: Aug. 15, 2017

(54) IMAGE FORMING APPARATUS

(71) Applicants: Mami Akiyama, Kanagawa (JP); Yuki Sato, Kanagawa (JP); Shiro Akama, Tokyo (JP); Yuta Ueda, Tokyo (JP); Hiroki Ishimitsu, Kanagawa (JP); Sakie Higuchi, Kanagawa (JP)

(72) Inventors: Mami Akiyama, Kanagawa (JP); Yuki Sato, Kanagawa (JP); Shiro Akama, Tokyo (JP); Yuta Ueda, Tokyo (JP); Hiroki Ishimitsu, Kanagawa (JP); Sakie Higuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/976,265

(22) Filed: Dec. 21, 2015

(65) Prior Publication Data
US 2016/0182756 A1 Jun. 23, 2016

(30) Foreign Application Priority Data
Dec. 22, 2014 (JP) .................... 2014-259142

(51) Int. Cl.
*H04N 1/00* (2006.01)
*G06K 9/00* (2006.01)

(52) U.S. Cl.
CPC ..... *H04N 1/00896* (2013.01); *G06K 9/00362* (2013.01); *H04N 1/00928* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,577,437 A | * | 3/1986 | Gionet .................... | E05F 15/73 318/480 |
| 5,908,000 A | * | 6/1999 | Spychalla ............... | B41F 15/12 101/115 |
| 7,782,215 B1 | * | 8/2010 | Knapp, Jr. .............. | F24B 1/191 340/517 |
| 8,768,196 B2 | * | 7/2014 | Baba .................. | G03G 15/5004 358/1.15 |
| 8,823,967 B2 | * | 9/2014 | Mamiya ................ | G06F 1/3231 340/565 |

(Continued)

FOREIGN PATENT DOCUMENTS

JP 2002-071833 3/2002
JP 2012-242140 12/2012

*Primary Examiner* — Ted Barnes
(74) *Attorney, Agent, or Firm* — Harness, Dickey & Pierce P.L.C.

(57) ABSTRACT

An image forming apparatus includes a first human body detector, a second human body detector, and a controller. The first human body detector has a first detection span to detect a human body to output a signal. The second human body detector has a second detection span to detect a human body to output a signal. The controller changes a state of the image forming apparatus from a standby state to an operation state in accordance with the output signal from each of the first human body detector and the second human body detector. A first center line of the first detection span intersects with a second center line of the second detection span at a portion where the first detection span and the second detection span overlap with each other in a planar view.

8 Claims, 5 Drawing Sheets

(56) References Cited

U.S. PATENT DOCUMENTS

| | | | | |
|---|---|---|---|---|
| 2010/0204953 A1* | 8/2010 | Onishi | G06F 3/0304 | 702/150 |
| 2012/0127538 A1* | 5/2012 | Mamiya | G06F 1/3231 | 358/442 |
| 2012/0229831 A1* | 9/2012 | Kuroishi | H04N 1/00891 | 358/1.13 |
| 2013/0010335 A1* | 1/2013 | Baba | G03G 15/5004 | 358/3.01 |
| 2013/0057894 A1* | 3/2013 | Narushima | G03G 15/5004 | 358/1.14 |
| 2013/0073887 A1* | 3/2013 | Miki | G06F 1/3231 | 713/323 |
| 2013/0219198 A1* | 8/2013 | Kuroishi | H04N 1/00896 | 713/310 |
| 2013/0250372 A1* | 9/2013 | Ogata | H04N 1/00323 | 358/442 |
| 2013/0258424 A1* | 10/2013 | Ono | H04N 1/00323 | 358/475 |
| 2014/0002843 A1* | 1/2014 | Miyamoto | H04N 1/00896 | 358/1.13 |
| 2014/0092417 A1* | 4/2014 | Kuroishi | H04N 1/00342 | 358/1.14 |
| 2014/0104631 A1* | 4/2014 | Baba | H04N 1/00323 | 358/1.13 |
| 2014/0140716 A1* | 5/2014 | Ogata | G03G 15/5016 | 399/81 |
| 2014/0153013 A1* | 6/2014 | Imamura | H04N 1/00037 | 358/1.12 |
| 2014/0333949 A1* | 11/2014 | Mamiya | G06F 1/3231 | 358/1.13 |
| 2014/0355020 A1* | 12/2014 | Shiraishi | H04N 1/00896 | 358/1.13 |
| 2015/0002871 A1* | 1/2015 | Ono | H04N 1/00896 | 358/1.13 |
| 2015/0256699 A1* | 9/2015 | Mamiya | G06F 1/3231 | 358/1.13 |
| 2015/0281497 A1* | 10/2015 | Ono | H04N 1/00896 | 358/1.13 |
| 2016/0142576 A1* | 5/2016 | Yamaguchi | H04N 1/00891 | 358/1.13 |
| 2016/0316086 A1* | 10/2016 | Ono | H04N 1/00896 | |

* cited by examiner

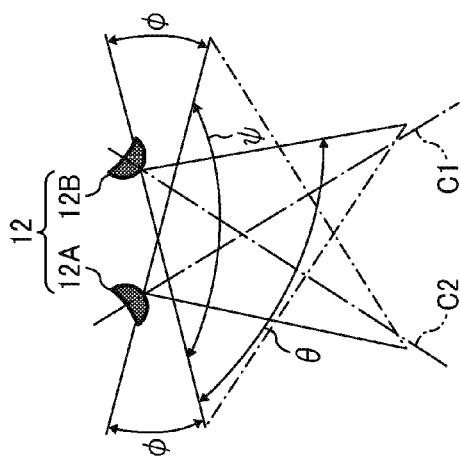
FIG. 3A
FIG. 3B
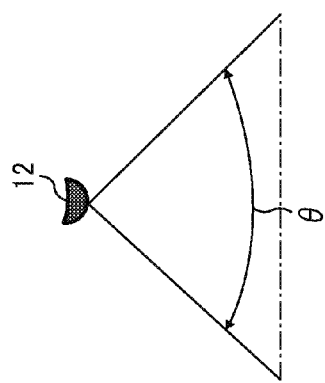
FIG. 4A
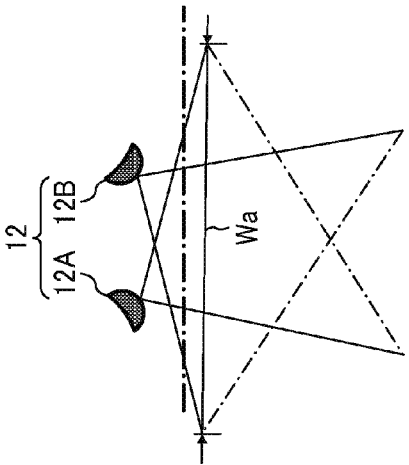
FIG. 4B

IMAGE FORMING APPARATUS

CROSS-REFERENCE TO RELATED APPLICATION

This patent application is based on and claims priority pursuant to 35 U.S.C. §119(a) to Japanese Patent Application No. 2014-259142, filed on Dec. 22, 2014, in the Japan Patent Office, the entire disclosure of which is hereby incorporated by reference herein.

BACKGROUND

Technical Field

Aspects of the present disclosure relate to an image forming apparatus.

Related Art

Typically, an image forming apparatus is in standby with less power consumption during non-use of the apparatus than during use, to save energy of the image forming apparatus. In recent years, the number of applications used in the image forming apparatus has increased, taking the apparatus more time to return from the standby. Hence, a human body detector may be used to return the image forming apparatus from the standby.

SUMMARY

In an aspect of this disclosure, there is provided an image forming apparatus including a first human body detector, a second human body detector, and a controller. The first human body detector oriented to a direction has a first detection span to detect a human body to output a signal. The second human body detector oriented to another direction different from the direction has a second detection span to detect a human body to output a signal. The controller changes a state of the image forming apparatus from a standby state to an operation state in accordance with the output signal from each of the first human body detector and the second human body detector. A first center line of the first detection span intersects with a second center line of the second detection span at a portion where the first detection span and the second detection span overlap with each other in a planar view.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIGS. 3A and 3B are illustrations of the human body sensor according to an embodiment of the present disclosure;

FIGS. 4A and 4B are illustrations of detection areas of the human body sensor according to an embodiment of the present disclosure;

Figure 1:
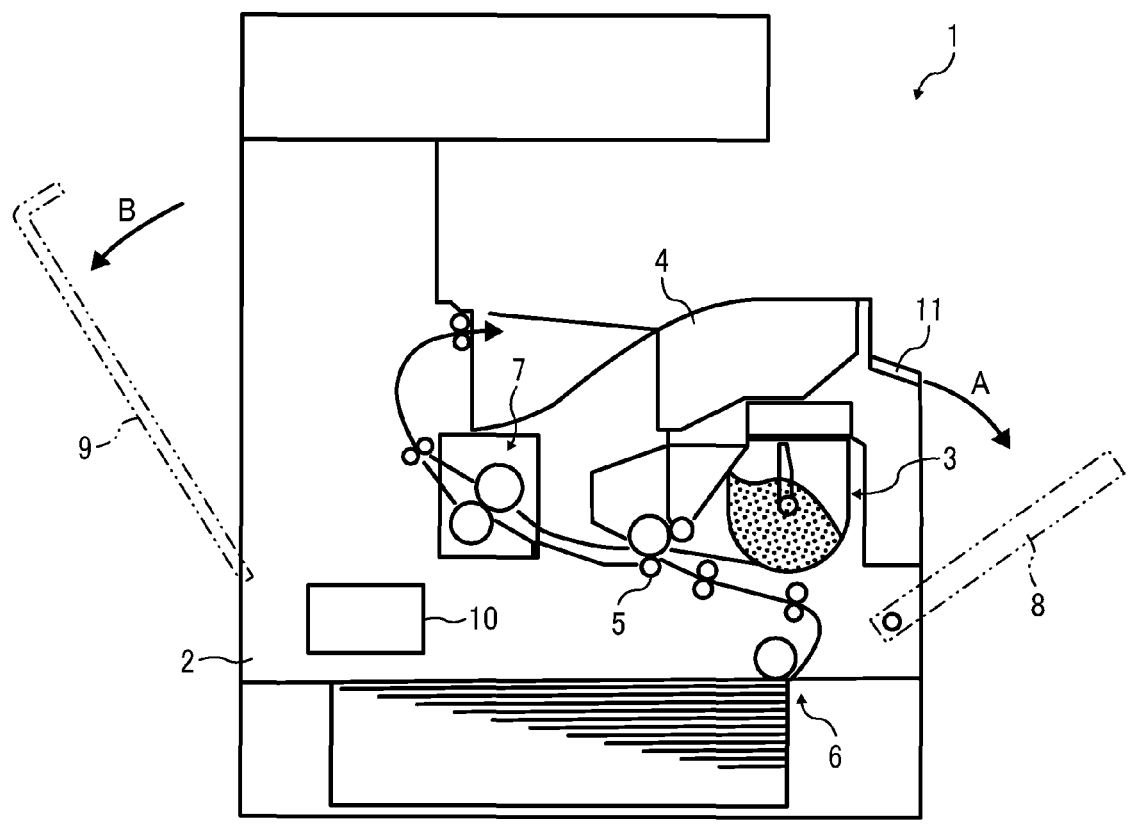
FIG. 1 is a schematic view of an image forming apparatus according to an embodiment of the present disclosure.
Figure 2:
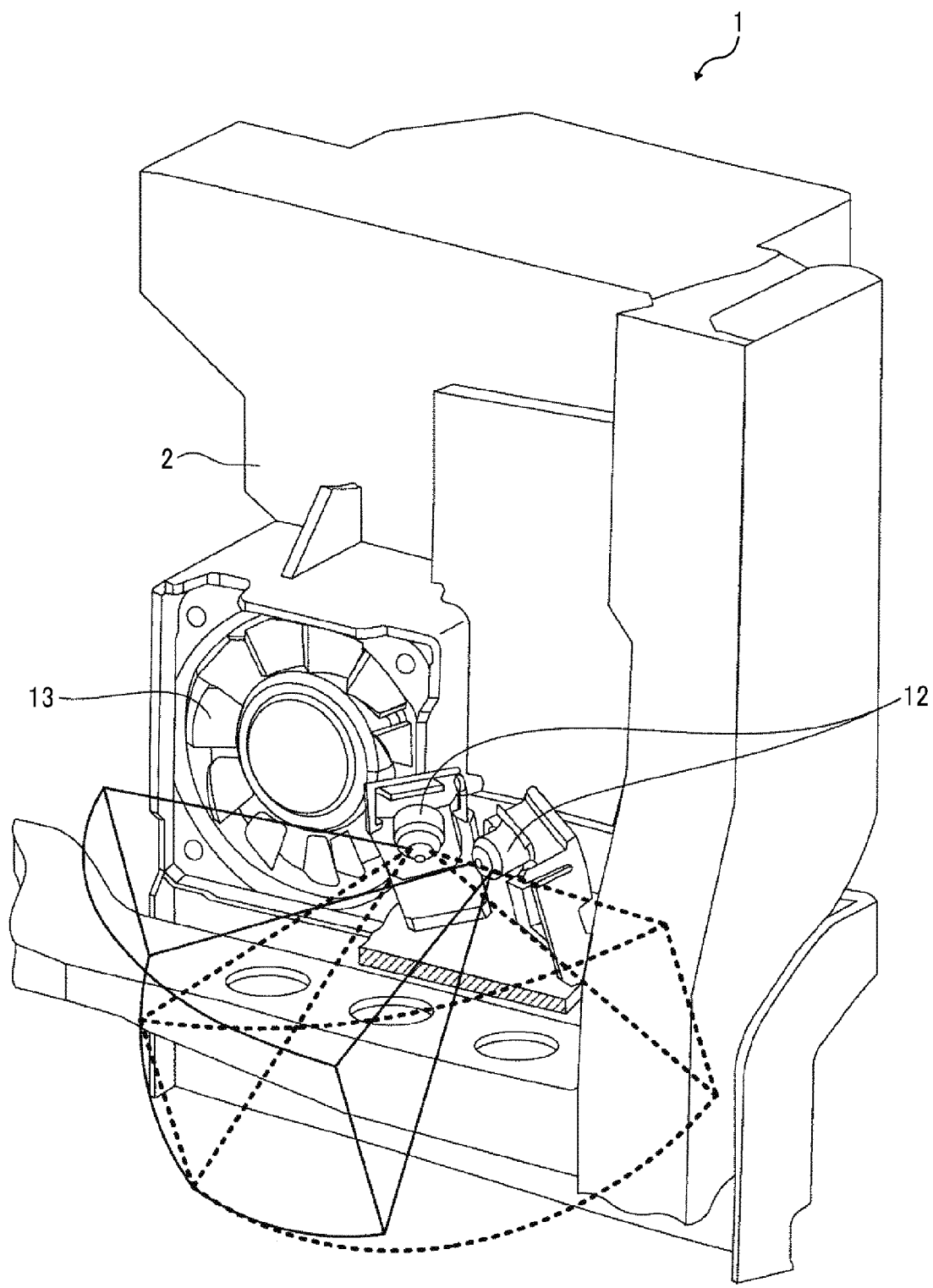
FIG. 2 is an illustration of arrangement of a human body sensor according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION (OF THE INVENTION)

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In FIG. 1, an image forming apparatus 1 is illustrated using an example of a monochrome printer. However, the image forming apparatus 1 of the present disclosure is not limited to the monochrome printer and may be, e.g., a copier, a printer, a facsimile machine, or a multi-functional peripheral having the foregoing capabilities.

The image forming apparatus 1 illustrated in FIG. 1 includes an apparatus body 2, process cartridge 3 having a developing device, a writing device 4, a transfer roller 5, a sheet feeder unit 6, and a fixing unit 7, to form images through an image forming process of an electrophotography system.

The apparatus body 2 includes an openable front cover 8 and rear cover 9. The apparatus body 2 basically houses the above-described components, such as the process cartridge 3, the writing device 4, the transfer roller 5, the sheet feeder unit 6, the fixing unit 7, and a controller 10. The controller 10 within the apparatus body 2 controls an image forming process through the process cartridge 3, the writing device 4, the transfer roller 5, the sheet feeder unit 6, and the fixing unit 7. That is, the controller 10 receives and sends various data from/to the above-described components via signal lines.

The apparatus body 2 also includes an operation panel 11 serving as an operation device above the front cover 8 disposed on the front side of the apparatus body 2. The operation panel 11, which is connected to the controller 10 via a signal line, includes various operation keys thereon. A user operates the image forming apparatus 1 with the keys and various information is displayed on the operation panel 11 and informed to the user. For example, the controller 10 controls the operation panel 11 to display a message prompting the user to replace the process cartridge 3 with new one. When such a message is displayed, the user opens the front cover 8 of the apparatus body 2 in a direction indicated by arrow A of FIG. 1 to replace the process cartridge 3 with new one. When the operation panel 11 displays a message for paper jam, the user opens the front cover 8 in the direction A or the rear cover 9, which is disposed at the opposite side of the front cover 8, in a direction indicated by arrow B of FIG. 1 to remove the jammed sheet.

FIG. 1 illustrates a monochrome printer including one process cartridge 3 for a single color, i.e., a black color, as an example. Alternatively, in some embodiments, a configuration similar to the above-described configuration of FIG. 1 is available for a color printer including a plurality of process cartridges.

The image forming apparatus 1 illustrated in FIG. 1 includes two human body sensors 12, a first sensor 12A and a second sensor 12B, serving as human body detectors, on the rear side of the apparatus body 2 near the operation panel 11. The first sensor 12A and the second sensor 12B are referred to collectively as the human body sensors 12. Each of the human body sensors 12 is a pyroelectric sensor to output a signal according to changes in the amount of incident infrared rays. For example, each of the human body sensors 12 outputs a signal to the controller 10 when a human body giving off heat to be detected approaches the human body sensors 12. Near the human body sensors 12, the image forming apparatus further includes an air suction fan 13 serving as an air sucker to suck in and blow outside air toward the human body sensors 12.

The controller 10 includes a microcomputer, such as a central processing unit (CPU), a read only memory (ROM), and a random access memory (RAM). Upon receiving an actuating signal of the operation panel 11 and a detection signal of each of the human body sensors 12, the controller 10 controls various operations of the image forming apparatus 1. The image forming apparatus 1 includes a power saving mode to light a minimum number of lamps, shutting down the power other than the lamps when no operation is performed for a predetermined period of time. Upon receiving a detection signal from each of the human body sensors 12 during the power saving mode, the controller 10 cancels the power saving mode to return the image forming apparatus 1 to a normal standby mode.

A description is provided of the human body sensors 12 (the first sensor 12A and the second sensor 12B) according to the present embodiment. Each of the human body sensors 12 has a viewing angle θ°, which defines a detection span, as illustrated in FIG. 3A. The first sensor 12A and the second sensor 12B are disposed in the following manner: a center line C1 of the viewing angle of the first sensor 12A intersects with a center line C2 of the viewing angle of the second sensor 12B, at a portion where the detection span of the first sensor 12A overlaps with the detection span of the second sensor 12B in a planar view. Further, an upper border line of the viewing angle of the first sensor 12A and an upper border line of the viewing angle of the second sensor 12B form an angle of φ°. In this case, the viewing angle is formed by the upper border line and the bottom border line. The center line C1 and the center line C2 each are referred to as a center line C below unless distinguished. In this configuration, as illustrated in FIG. 3B, a viewing angle of Ψ° in the configuration in which the two human body sensors, the first sensor 12A and the second sensor 12B, are employed is larger than a viewing angle of the single human body sensor by an angle of 2φ°. That is, Ψ° is larger than θ° by a degree of 2φ.

Now, referring to FIG. 4A, the first sensor 12A and the second sensor 12B are inwardly oriented. In FIG. 4B, the first sensor 12A and the second sensor 12B are outwardly oriented. In both cases of FIG. 4A and FIG. 4B, the viewing angle is Ψ°. Each of the reference sign Wa of FIG. 4A and the reference sign Wb of FIG. 4B refers to a width that allows a viewing angle to be obtained on a line I of a position slightly apart from the human body sensors 12. As illustrated in FIGS. 4A and 4B, Wb is larger than Wa, because the detection span defined by the viewing angle of the first sensor 12A overlaps with the detection span defined by the viewing angle of the second sensor 12B in FIG. 4A.

In the above-described configuration, assuming that the line I is the exterior surface of the apparatus body 2 including the human body sensors 12, each of the widths Wa and Wb refers to the width of a slit formed on the exterior surface. Reducing the width of the slit is advantageous from the viewpoint of a design. In addition, any other components should not interfere with the detection of the human body sensors 12 within a range of each of the widths Wa and Wb on the inner side of the exterior surface. Thus, reducing the width W allows saving a space.

Typically, the human body sensors 12 detects a human body approaching from the front of the image forming apparatus. However, in a case of detecting a human body approaching from a lateral direction, the accuracy of the detection varies with viewing angles of the human body sensors 12. This is why, there is a case that the human body sensors 12 fail to detect or take time in detecting the human body unless the human body sufficiently approaches the human body sensors 12. When a plurality of human body sensors are merely arranged, there is not enough space except the detection range of the human body sensors 12 to dispose other components, which prevents saving a space.

According to the present embodiment with the above-described configuration, a wider viewing angle is obtained, thereby allowing more prompt detection of a human body coming close to the human body sensors 12, than the configuration with a single of the human body sensor 12 employed. Further, two human body sensors 12 are oriented toward a direction that allows the detection spans overlap with each other in a planar view and that allows the center lines C1 and C2 of the respective detection spans intersect with each other at a portion where the detection spans overlap with each other. With this configuration, a space is shared by the two human body sensors 12, thus allowing a space saving.

Figure 5A:
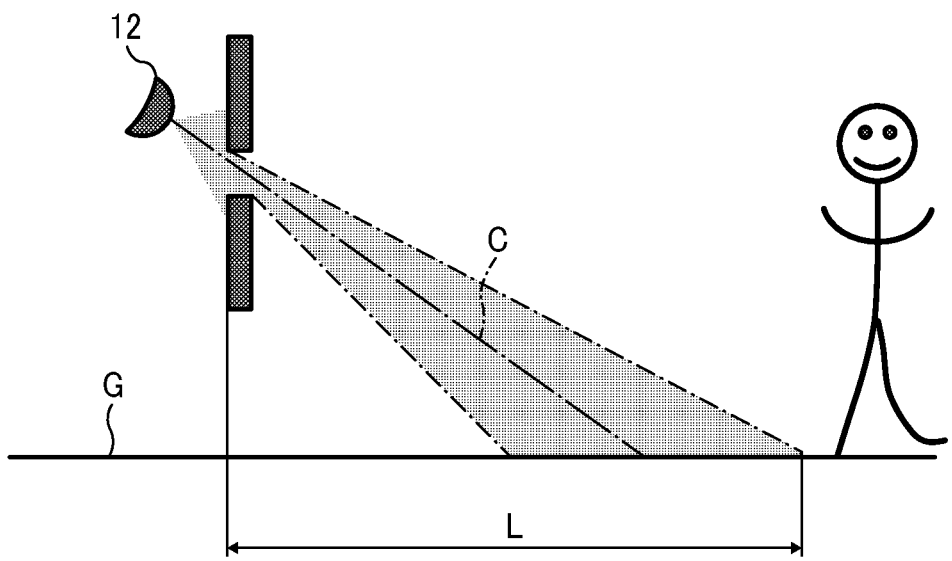
FIGS. 5A and 5B are illustrations of arrangement of a human body sensor according to another embodiment of the present disclosure.
Figure 5B:
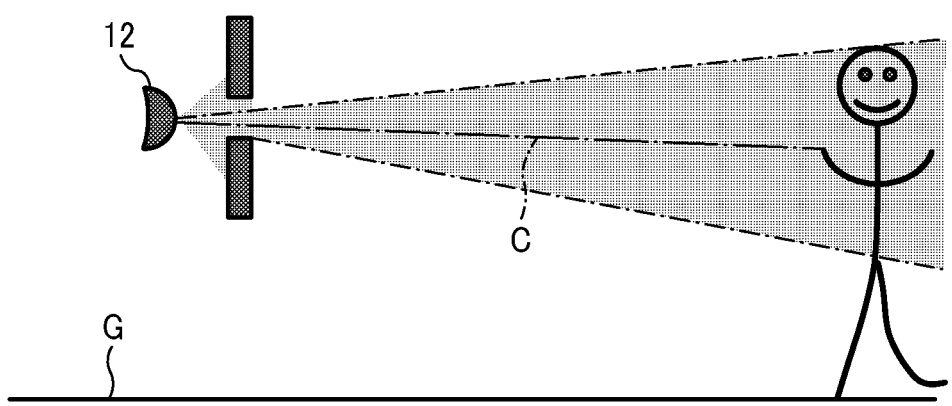

FIGS. 5A and 5B are illustrations of the position at which each of human body sensors 12 according to an embodiment of the present disclosure is disposed in a vertical direction. FIG. 5A is an illustration of each of the human body sensors 12 disposed with the center line C downwardly directed toward an installation surface G of the image forming apparatus 1. FIG. 5B is an illustration of each of the human body sensors 12 disposed with the center line C directed in parallel with the installation surface G. In the case of FIG. 5B, the human body sensors 12 might unsuccessfully detect a person not intending to use the apparatus, because the person fall within the detection area even though the person is far away from the human body sensors 12. Further, in the configuration in which the human body sensors 12 are pyroelectric sensors to output a signal according to changes in the amount of infrared rays, the human body sensors 12 may fail to detect a further approach of a user entering the detection area. This is because there is no change in the amount of infrared rays.

In the case of FIG. 5A, in which the center line C is downwardly directed to the installation surface G to apply a projection range over the installation surface G, a sufficient amount of the detection distance L is set as an arbitrary distance. In this case, when a user, who is farther distance from the distance L, comes to enter the detection range, there is a change in the amount of infrared rays, resulting in the human body sensors 12 detecting the access of the user. With this configuration, a sufficient amount of distance that allows detection of a human body is set as an arbitrary distance, thereby preventing failures, such as erroneous detection and detection failure.

In the present embodiment, near the human body sensors 12, the image forming apparatus further includes an air suction fan 13 serving as an air sucker to suck in and blow outside air toward the human body sensors 12. With this configuration, the air sucked in by the air suction fan 13 passes by the human body sensors 12, thereby maintaining a constant level of the ambient temperature around the human body sensors 12. As a result, the detection accuracy of the human body sensors 12 is secured. Further, each of the human body sensors 12 includes an integrally-mounted lens, airflow flowing along the surface thereof to prevent dust from adhering onto the lens. Thus, a deterioration in the detection performance of the human body sensors 12 is prevented.

Figure 6A:
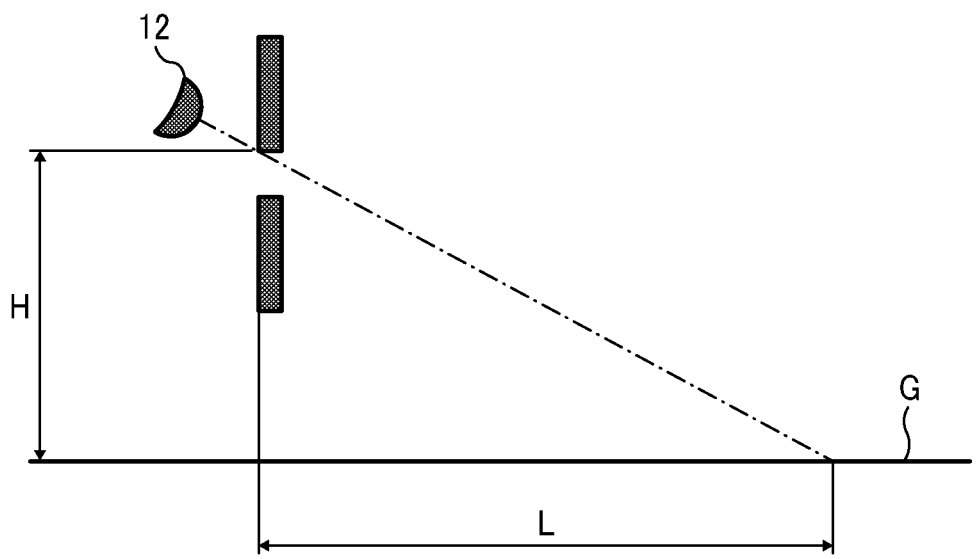
FIGS. 6A and 6B are illustrations of arrangement of a human body sensor according to still another embodiment of the present disclosure.
Figure 6B:
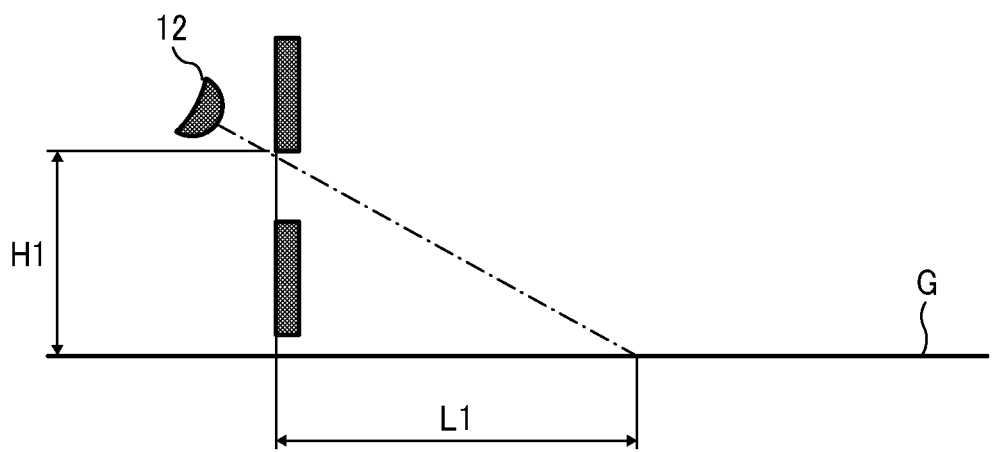

FIGS. 6A and 6B is an illustration of advantageous effects from the viewpoint of disposing each of the human body sensors 12 at a high position in a vertical direction. In FIG. 6A, the human body sensors 12 are disposed at a position with a height H to detect a human body within a range of a detection distance L. In FIG. 6B, the human body sensors 12 are disposed at a position with a height H1. In this case, the height H1 is smaller than the height H, and the distance L1 is shorter than the distance L. That is, the detection range in the case of FIG. 6B is smaller than that of FIG. 6A.

A user of the image forming apparatus 1 typically accesses the operation panel 11. Disposing the human body sensors 12 at a position around the height of the operation panel 11 secures a sufficient detection distance L, thereby precisely detecting the user of the image forming apparatus 1. Further, disposing the human body sensors 12 at a position higher than that of the operation panel 11 secures a longer detection distance L.

In the above-described embodiment, the configuration with two human body sensors 12 employed is described as an example of the embodiment. Alternatively, in some embodiments, the configuration with three or more human body sensors 12 employed is available to obtain the same operation and effects as the above-described embodiment does. In the above-described embodiment, the configuration with pyroelectric sensors employed as two human body sensors 12 is described as an example of the embodiment. However, the human body sensors of the present disclosure are not limited to this configuration and other types of sensors are available.

Although the embodiments of the present disclosure have been described above, the present disclosure is not limited to the embodiments described above, and a variety of modifications can naturally be made within the scope of the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus comprising:
    a first human body detector oriented to a direction, including a first detection span to detect a human body, and outputting a signal in response to detecting the human body;
    a second human body detector oriented to another direction different from the direction of the first human body detector, including a second detection span to detect the human body, and outputting a signal in response to detecting the human body, the first human body detector being spaced apart from the second human body detector in a body of the image forming apparatus; and
    a controller to change a state of the image forming apparatus in accordance with the output signal from each of the first human body detector and the second human body detector,
    the first human body detector and the second human body detector, being spaced apart from each other, and each including an inward facing orientation with respect to each other such that a first center line of the first detection span intersects with a second center line of the second detection span at a portion where the first detection span and the second detection span overlap with each other in a planar view, enabling a combined viewing angle to be obtained that is relatively wider than a first viewing angle defining the first detection span and a second viewing angle defining the second detection span individually.

2. The image forming apparatus according to claim 1, wherein each of the first human body detector and the second human body detector is oriented to direct each of the first center line and the second center line downwardly toward an installation surface.

3. The image forming apparatus according to claim 1, further comprising an air sucker at a position to blow air towards the first human body detector and the second human body detector.

4. The image forming apparatus according to claim 1, further comprising an operation device at a position having a same height as the first human body detector and the second human body detector.

5. The image forming apparatus according to claim 1, further comprising an operation device at a position having a height below the first human body detector and the second human body detector.

6. The image forming apparatus according to claim 1, wherein changing the state of the image forming apparatus includes changing from a standby state to an operation state.

7. A method performed by a processor of an image forming apparatus, the method comprising:
    receiving, at the processor, a first detection signal from a first human body detector oriented to a first direction and including a first detection span to detect a human body, the first human body detector outputting the first detection signal in response to detecting the human body;
    receiving, at the processor, a second detection signal from a second human body detector oriented to a second direction that is different from the first direction of the first human body detector and including a second detection span to detect a human body, the second human body detector outputting the second detection signal in response to detecting the human body,
    the first human body detector being spaced apart from the second human body detector in a body of the image forming apparatus, and the first human body detector and the second human body detector, being spaced apart from each other, and each including an inward facing orientation with respect to each other such that a first center line of the first detection span intersects with a second center line of the second detection span at a portion where the first detection span and the second detection span overlap with each other in a planar view, enabling a combined viewing angle to be obtained that is relatively wider than a first viewing angle defining the first detection span and a second viewing angle defining the second detection span individually; and changing, by the processor, a state of the image forming apparatus upon receiving the first detection signal output by the first human body detector and the second detection signal output by the second human body detector in accordance with the received first and second detection signals.

8. The method according to claim 7, wherein changing the state of the image forming apparatus includes canceling a power saving mode so as to return the image forming apparatus to a normal standby mode.

\* \* \* \* \*